United States Patent [19]
Tsubouchi et al.

[11] Patent Number: 5,857,399
[45] Date of Patent: Jan. 12, 1999

[54] BRAKE BOOSTER APPARATUS FOR A VEHICLE

[75] Inventors: Kaoru Tsubouchi, Toyota; Akihiko Miwa, Anjo, both of Japan

[73] Assignee: Aisin Seiki Kabushiki Kaisha, Kariya, Japan

[21] Appl. No.: 900,108

[22] Filed: Jul. 25, 1997

[30] Foreign Application Priority Data

Aug. 2, 1996 [JP] Japan .................................. 8-205108

[51] Int. Cl.⁶ ........................................................ F15B 9/10
[52] U.S. Cl. ...................................... 91/369.1; 91/376 R
[58] Field of Search .................. 91/369.1, 369.2, 91/376 R

[56] References Cited

U.S. PATENT DOCUMENTS

| 5,096,267 | 3/1992 | Volz ................................. 91/376 R X |
| 5,172,964 | 12/1992 | Levrai et al. ...................... 91/376 R X |
| 5,437,217 | 8/1995 | Castel et al. ...................... 91/376 R X |
| 5,605,088 | 2/1997 | Balz et al. ........................ 91/376 R X |
| 5,609,087 | 3/1997 | Horikoshi .............................. 91/376 R |
| 5,704,269 | 1/1998 | Satoh .................................... 91/376 R |
| 5,711,202 | 1/1998 | Tsubouchi ......................... 91/376 R X |

FOREIGN PATENT DOCUMENTS

44 05 092  12/1994  Germany .

*Primary Examiner*—Hoang Nguyen
*Attorney, Agent, or Firm*—Burns, Doane, Swecker & Mathis, LLP

[57] ABSTRACT

A brake booster apparatus for a vehicle has a constant pressure chamber, a variable pressure chamber, a control valve, a power piston, a plunger member and a solenoid coil. The plunger member is actuated under the energized condition of the solenoid coil. The power piston is actuated in response to the depression of a brake pedal and/or plunger movement. The output force of the brake booster is amplified by the pressure difference between the variable and constant pressure chambers. A clearance is provided between the input member and the plunger member to permit relative movement of the input member and the plunger member. The relative movement generates a continuous variable output force of the brake booster.

19 Claims, 6 Drawing Sheets

BRAKE BOOSTER APPARATUS FOR A VEHICLE

FIELD OF THE INVENTION

The present invention generally relates to a vacuum type brake booster apparatus. More particularly the present invention pertains to a vacuum type brake booster apparatus for a vehicle brake system in which a solenoid is used to establish automatic brake actuation.

BACKGROUND OF THE INVENTION

German Patent Laid-Open Publication No. 4,405,092C1 discloses a brake booster apparatus which has a solenoid coil for establishing automatic brake actuating operation. The brake booster includes a housing, a plurality of movable walls, a power piston, an input rod, an input member, a plunger member, a pressure control valve and a solenoid coil. The movable walls form front and rear constant pressure chambers, and front and rear variable pressure chambers. The variable pressure chambers are selectively communicated with the constant pressure chambers in response to the operation of the pressure control valve. The constant pressure chambers are communicated with an intake manifold (negative pressure source) of the engine at all times. The power piston is fixed to the movable walls, and in response to a pressure difference between the constant pressure chambers and the vacuum pressure chambers, the position of the movable walls changes. According to the movement of the movable walls, the power piston is actuated.

The pressure control valve is comprised of an atmospheric control valve and a negative pressure control valve. The atmospheric control valve controls communication between the variable pressure chambers and the atmosphere. The negative pressure control valve controls communication between the constant pressure chambers and the variable pressure chambers. Under the energized condition of the solenoid coil, the solenoid coil actuates the plunger member and the power piston, and the brake booster generates an operating force of the brake master cylinder.

Figure 9:
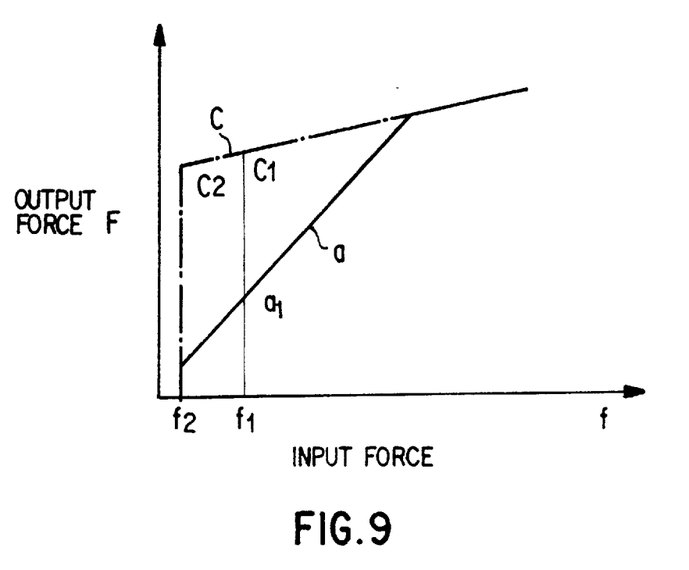
FIG. 9 is a graph illustrating the output characteristics of a conventional brake booster.

The operation of the conventional brake booster can be seen with reference to FIG. 9 which graphically illustrates the relationship between the input force and the output force. The vertical axis represents the output value of the brake booster, and the horizontal axis represents the depression force of the brake pedal. The broken line C represents when the solenoid coil is energized. When the brake pedal is depressed with a force $f_1$, the atmospheric control valve is operated to an open position. As a result, the movable walls and the power piston are operated and an output force corresponding to the point $a_1$ is generated.

When the brake pedal has been rapidly depressed in an emergency situation, the solenoid coil is energized to attract the plunger member. The power piston is operated in response to the actuation of the solenoid coil. As a result, an output force corresponding to the point $C_1$ is generated. After this time, the brake booster generates an output force along the broken line C. Under the condition where the depression force $f_1$ is applied, when the solenoid is energized at point $a_1$, the output force changes to point $C_1$.

The above mentioned conventional brake booster suffers from a variety of disadvantages. In one respect, due to the ON-OFF controlling solenoid, the brake booster cannot generate a continuous variable output in response to the input force. More specifically, the brake booster is not able to generate an appropriate braking force in response to the load of the vehicle. Further, an appropriate output brake force cannot be generated to effect an automatic braking operation. Furthermore, when the brake pedal is released, the diminution of the braking force is not responsive to the driver's intention.

SUMMARY OF THE INVENTION

In light of the foregoing, a need exists for an improved brake booster apparatus that is able to overcome at least the above drawbacks. It would be desirable to provide a brake booster apparatus which can generate a continuously variable output in response to the input force of the depression of the brake pedal.

It would also be desirable to provide a brake booster which can be operated in accordance with the intention of the driver.

In order to achieve the above mentioned objects, a brake booster apparatus for a vehicle includes a housing forming a pressure chamber, a movable wall arranged in the pressure chamber to form a constant pressure chamber and a variable pressure chamber, a power piston carried by the movable wall, and an input rod extending outwardly from the power piston for connection to a brake pedal to be moved by depression of the brake pedal. An axially movable input member is mounted within the power piston and is operatively engaged with the input rod, while an axially movable plunger member is carried by the input member. An air control valve is provided for communicating the variable pressure chamber with the atmosphere, and a vacuum control valve is provided for communicating the variable pressure chamber and the constant pressure chamber. A reaction disc generates a reaction force in accordance with the propulsive power of the power piston caused by the pressure difference between the variable pressure chamber and the constant pressure chamber, and an output rod transmits an output force of the power piston through the reaction disc. A solenoid coil actuates the plunger member in response to a supplied current value. The plunger member moves in response to the movement of the input member under the energized condition of the solenoid coil and the output force of the brake booster continuously changes in response to the supplied current value of the solenoid coil.

According to another aspect of the invention, a brake booster apparatus for a vehicle includes a housing forming a pressure chamber, a movable wall arranged within the pressure chamber to form a constant pressure chamber and a variable pressure chamber, a power piston carried by the movable wall, an input rod extending outwardly from the power piston for connection to a brake pedal to be moved by depression of the brake pedal, an axially movable input member mounted within the power piston and operatively engaged with the input rod and an axially movable plunger member disposed within the power piston. First and second biasing members are arranged between the input member and the plunger member for imparting a biasing force between the plunger member and the input member. An air control valve positioned within the power piston selectively permits and prevents communication between the variable pressure chamber and atmosphere while a vacuum control valve positioned within the power piston selectively permits and prevents communication between the variable pressure chamber and the constant pressure chamber. An output rod transmits the output force of the power piston and a solenoid coil actuates the plunger member during the energized condition of the solenoid coil.

Another aspect of the invention involves a brake booster apparatus that includes a housing forming a pressure chamber, a movable wall arranged within the pressure chamber to form a constant pressure chamber and a variable pressure chamber, a power piston carried by the movable wall, an input rod extending outwardly from the power piston for connection to a brake pedal to be moved by depression of the brake pedal, an axially movable input member mounted within the power piston and operatively engaged with the input rod and an axially movable plunger member disposed within the power piston. An air control valve positioned within the power piston selectively permits and prevents communication between the variable pressure chamber and atmosphere while a vacuum control valve positioned within the power piston selectively permits and prevents communication between the variable pressure chamber and the constant pressure chamber. An output rod transmits the output force of the power piston and a solenoid coil actuates the plunger member during the energized condition of the solenoid coil. The booster is designed so that during energization of the solenoid, the output force changes when the input rod is moved in response to depression of the brake pedal.

BRIEF DESCRIPTION OF THE DRAWING FIGURES

Other features associated with the present invention will be more readily appreciated from the following detailed description considered with reference to the accompanying drawing figures in which like elements are designated by like reference numerals and wherein.

DETAILED DESCRIPTION OF THE PREFERRED EMBODIMENT

In the following detailed description, the forward portion and the forward end portion refer to the direction of the output side of the brake booster, while the rear portion and the rear end portion refer to the direction of the input side of the brake booster. The input/output shaft refers to the input/output shaft of the brake booster, and the center axis is parallel to the input/output shaft. Reference to the radial direction means a direction perpendicular to the input/output shaft of the brake booster.

Figure 1:
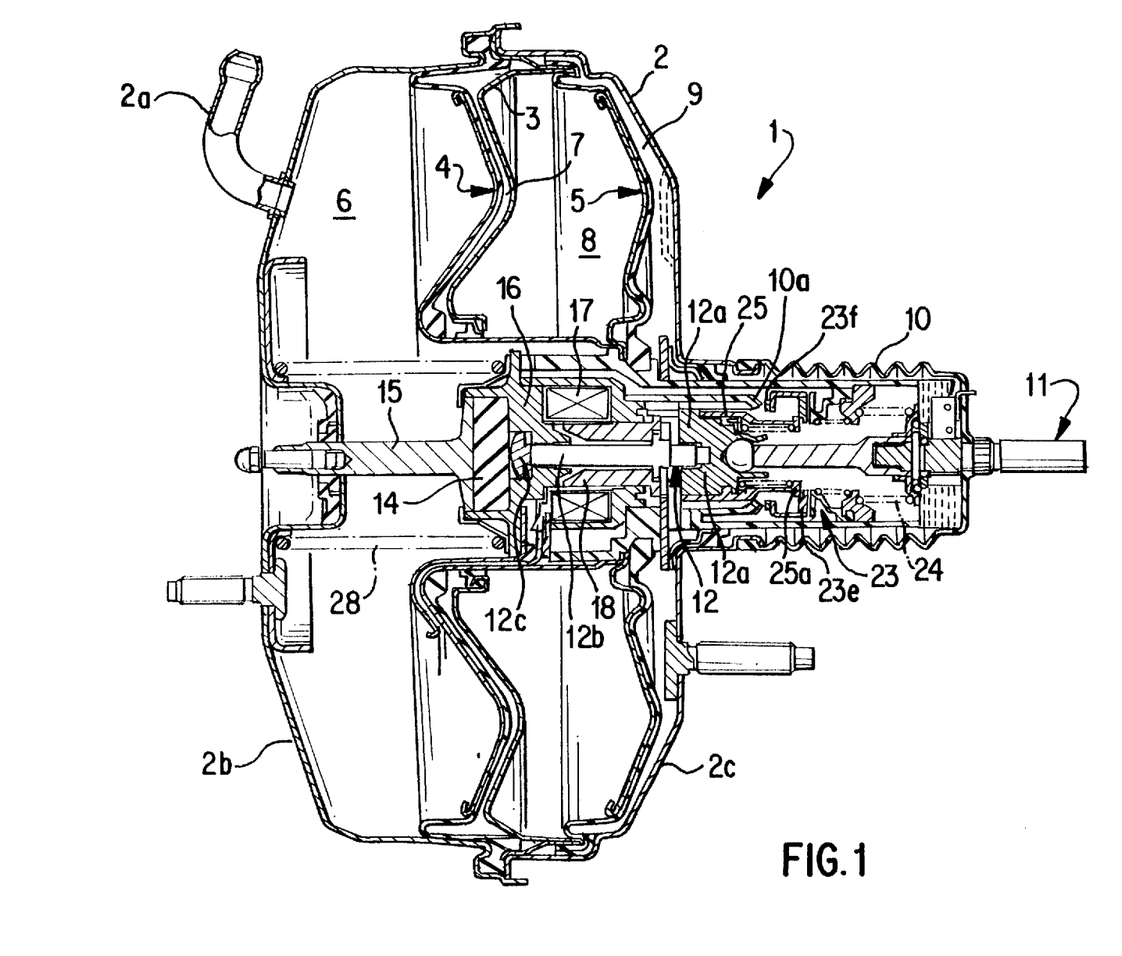
FIG. 1 is a cross-sectional view of the brake booster in accordance with the present invention.

FIG. 1 is a cross-sectional view, taken along the direction of the input/output shaft of the brake booster apparatus 1 according to an embodiment of the present invention which is adapted to be used in a vehicle. Referring to FIG. 1, the brake booster 1 includes a projecting portion on its input side communicating with the atmosphere and also has a substantially conically-shaped housing 2 on its outlet side provided with an inlet connector 2a communicating with the intake manifold of the engine. A bellows-shaped tube is connected to the end face of the projecting portion of the housing 2. This bellows-shaped tube is adapted to be moved substantially along the input/output shaft and the input rod 11 connected to a brake pedal operated by the driver. Within the housing 2 and the bellows-shaped tube is a power piston 10 formed as a double tube having a fluid passage. A movable rear wall 5, a fixed wall 3 and a movable front wall 4, all formed substantially in the shape of a diaphragm, are accommodated within the housing 2.

The rear wall 2c of the housing 2 and the movable rear wall 5 form a rear variable pressure chamber 9. The rear movable wall 5 and the fixed wall 3 form a rear constant pressure chamber 8. The fixed wall 3 and the movable front wall 4 form a front variable pressure chamber 7. The movable front wall 4 and the front wall 2b of the housing 2 form a front constant pressure chamber 6.

The outer peripheral part of the movable rear wall 5 is supported by the housing 2 for maintaining the air-tightness of the rear variable pressure chamber 9 and the rear constant pressure chamber 8. The movable rear wall 5 is moved toward the output side substantially along the input/output shaft by atmospheric air flowing into the rear variable pressure chamber 9 while the rear constant pressure chamber 8 is under negative pressure conditions. Based on this movement, the power piston 10 is moved towards the output side (i.e., to the left in FIGS. 1 and 2) substantially along the input/output shaft (stroke movement).

The outer peripheral part of the movable front wall 4 is supported with respect to the housing 2 so that air-tightness of the front variable pressure chamber 7 and the front constant pressure chamber 6 is achieved. The movable front wall 4 is moved substantially along the input/output shaft by atmospheric air flowing into the front variable pressure chamber 7 while the front constant pressure chamber 6 is under negative pressure. As a result of this movement, the power piston 10 is moved towards the outlet side (i.e., to the left in FIGS. 1 and 2) substantially along the input/output shaft (stroke movement).

The rear variable pressure chamber 9 and the front variable pressure chamber 7, which define a pair of variable pressure chambers, are in constant communication with each other. The rear variable pressure chamber 9 and the front variable pressure chamber 7 are selectively in communication or out of communication with the atmosphere by virtue of the operation of an atmospheric control seal which will be described below in more detail. To control the communication of the rear variable pressure chamber 9 and the front variable pressure chamber 7 with the atmosphere, the atmospheric control seal is either spaced apart from or in contact with an atmospheric control seal valve which will be described below in more detail.

The rear constant pressure chamber 8 and the front constant pressure chamber 6, which define a pair of constant pressure chambers, are continually in communication with each other. The variable pressure chambers 9, 7 and the constant pressure chambers 8, 6 selectively communicate with or are disconnected from each other by a negative pressure control seal which will be described below in more detail. The negative pressure control seal is adapted to be spaced apart from or in contact with a negative pressure control seal valve, which will be described below in more detail, to communicate or disconnect the variable pressure chambers from the constant pressure chambers.

The rear constant pressure chamber 8 and the front constant pressure chamber 6 communicate with the inlet connector 2a that is connected to a negative pressure source such as the engine intake manifold. The front and rear constant pressure chambers 6, 8 are thus continually under a negative pressure condition.

The inner periphery of the movable rear wall 5 and the inner periphery of the movable front wall 4 are supported on the outer periphery of the power piston 10 in a manner that maintains an air-tight condition of the variable pressure chambers 7, 9 and the constant pressure chambers 6, 8. The movable rear wall 5 is positioned to the input side (i.e., the right side as seen in FIG. 1) of the movable front wall 4. The inner periphery of the fixed wall 3 abuts against the movable front wall 4 to effect an air-tight condition in the rear constant pressure chamber 8 and the front variable pressure chamber 7.

The power piston 10 moves in a direction substantially along the input/output shaft of the brake booster 1 in response to stroke movement of the input rod 11, and slides via the movable front wall 4 with respect to the inner periphery of the fixed wall 3. The movable rear wall 5 and the movable front wall 4 correspondingly move according to this stroke movement.

Figure 2:
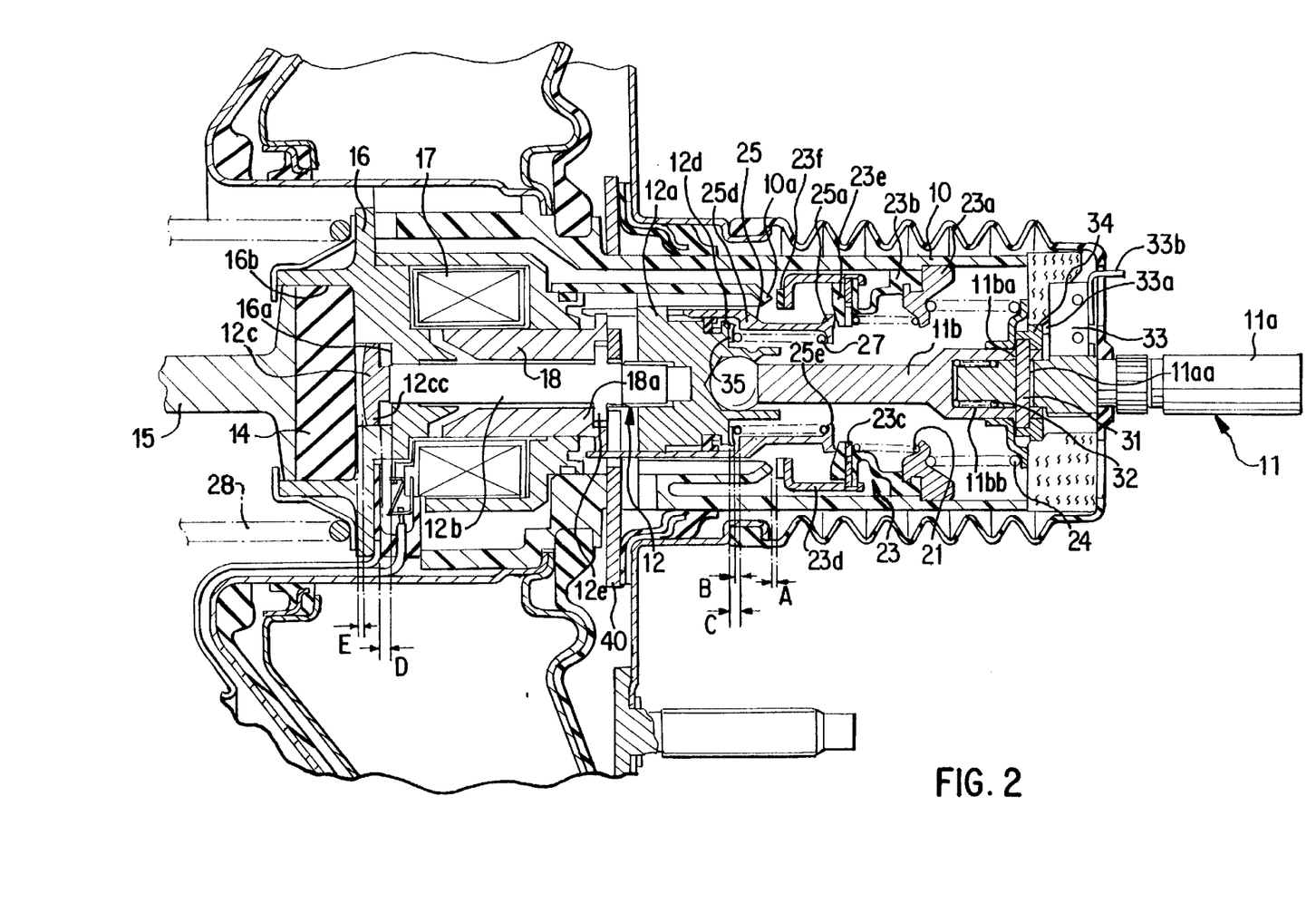
FIG. 2 is an enlarged cross-sectional view of a portion of the brake booster shown in FIG. 1.

As illustrated in FIGS. 1 and 2, the input rod 11 is arranged at the input end of the brake booster 1. The rear end of the input rod 11 projects out of the housing 2 and is adapted to be connected to a brake pedal. The forward end portion of the input rod 11 extends into the power piston 10 through the input side end face of the projecting portion of the housing 2.

A small diameter portion of the power piston 10 located at the input side of the power piston (i.e., the right side of the power piston 10 as seen in FIG. 2) extends along the inner periphery of the bellows-like tube that is connected to the projecting portion of the housing 2. This bellows-like tube is adapted to be compressed and deformed during stroke movement of the input rod 11. An annular filter or silencer is arranged substantially coaxially with the input rod 11 on the input side end portion of the input rod 11.

As shown in FIG. 2, the input rod 11 is comprised of a first input rod portion 11a and second input rod portion 11b. A slit 11aa is formed in the first input rod portion 11a while a bore 11ba is formed in the second input rod portion 11b. A connection pin 31 is located within the slit 11aa and the bore 11ba in such a way that the pin 31 is slidably connected to the first input rod portion 11a, but is tightly fixed to the bore 11ba of the second input rod portion 11b.

The input side end (i.e., the right end as seen with reference to FIG. 2) of the second input rod portion 11b is provided with a blind hole 11bb and it is through this blind hole 11b that the first input rod portion 11a engages the second input rod portion 11b. A compression spring 32 is located within the blind hole 11bb and is arranged between the first input rod portion 11a and the second input rod portion 11b.

An input portion 12 of the brake booster is located within the power piston 10. The input portion 12 includes a first input element 12a, a second input element 12b and a third input element 12c arranged in that order from the input side towards the output side (i.e., from the right towards the left in FIG. 2). A disk shaped stopper 40 is positioned between the first input element 12a and the second input element 12b.

The second input rod portion 11b of the input rod 11 is connected to the first input element 12a of the input portion 12 so that the input rod 11 and the input portion 12 move together as one body. As seen in FIG. 2, a micro switch 33 is mounted on the upper portion of the first input rod portion 11a at the input end of the first input rod portion 11a. The micro switch 33 includes an operating portion 33a and a conducting wire 33b. The operating portion 33a of the micro switch 33 is adapted to generate a control signal.

A contacting element 34 is mounted on the outer periphery of the connection pin 31, and the operating portion 33a is designed to engage the contacting element 34. The location of the first input rod portion 11a and the second input rod portion 11b is determined based on depression of the brake pedal.

In the non-operational condition of the brake booster apparatus shown in FIG. 2, a clearance exists between the left side end portion of the first input rod portion 11a and the bottom of the blind hole 11bb in the second input rod portion 11b. Similarly, in the non-operational condition of the brake booster apparatus shown in FIG. 2, a clearance exists between the operating portion 33a and the contacting element 34, and this clearance causes the micro switch 33 to be in the off state.

A spring retainer is mounted on the connection pin 31 and is located on the outer periphery of the input rod 11. This spring retainer receives the load force of a return spring 24.

A first plunger member 18 and a second plunger member 25 are disposed within the power piston 10. The first plunger member 18 is located on the output side (i.e., to the left in FIGS. 1 and 2) with respect to the second plunger member 25. The end of the second plunger 25 that is located on the output side (i.e., the left side shown in FIGS. 1 and 2) is connected to the first plunger member 18.

A control valve 23 is disposed within the power piston 10 on the output side of the spring retainer that is mounted on the connection pin 31. The control valve 23 includes a first retainer 23a, a seal portion 23b, a spring retainer 23c, a substantially tube shaped valve plate 23d, an atmospheric control seal 23e and a negative pressure control seal 23f. The first retainer 23a receives the spring force of the return spring 24 via the spring retainer that is mounted on the connecting pin 31. Thus, the spring 24 acts between the spring retainer that is mounted on the connecting pin 31 and the first retainer portion 23a.

One end of the seal portion 23b is connected to the first retainer 23a and the opposite end is connected to the spring retainer 23c. The valve plate 23d is fixed to the spring retainer 23c and the atmospheric control seal 23e is mounted on or secured to the spring retainer 23c. The negative pressure control seal 23f is mounted on or secured to the spring retainer 23c.

A contact face 25d is formed along the inner portion of the second plunger member 25. Also, an atmospheric control seal valve 25a is mounted on the second plunger member 25. The output side of the atmospheric control seal 23e faces the atmospheric control seal valve 25a. Also, the output side of the negative pressure control seal 23f faces the negative pressure control seal valve 10a. During operation of the brake booster apparatus, the atmospheric control seal 23e is adapted to engage the atmospheric control seal valve 25a and the negative pressure control seal 23f is adapted to engage the negative pressure control seal valve 10a. The negative pressure control seal valve 10a and the negative pressure control seal 23f define a vacuum control valve while the atmospheric control seal valve 25a and the atmospheric control seal 23e define an air control valve.

A compression spring 21 is disposed between the first retainer 23a and the spring retainer 23c to apply a compression force to the atmospheric control seal 23e and the negative pressure control seal 23f. The return spring 24 is designed to apply a compression force to the input rod 11 in the direction of the input side.

The input portion 12 is arranged at the input side of the input rod 11. As stated above, the input portion 12 includes the first input element 12a, the second input element 12b and the third input element 12c. A contact face 12d is formed at the input side of the first input element 12a and this contact face 12d faces the contact face 25d of the second plunger member 25.

A first biasing member 27 and a second biasing member 35, which are arranged in series, are interposed under compression on the inner surface of the second plunger member 25. The second biasing member 35 is generally dish shaped and is located between the contact face 12d of the first input element 12a and the contact face 25d of the second plunger member 25. The first biasing member 27 is a coil shaped biasing member and is disposed between the second biasing member 35 and a flange portion 25e of the second plunger member 25. The contact face 25d and the contact face 12d are adapted to engage each other through the first biasing member 27 and the second biasing member 35.

The outer surface of the second input element 12b is provided with an outwardly extending projecting portion 12e. The projecting portion 12e is adapted to engage a step portion 18a of the first plunger member 18. The disk shaped stopper 40 that is arranged between the first input element 12a and the second input element 12b functions to regulate excessive stroke of the input portion 12. According to the movement of the input portion 12 and the input rod 11, the first and second plunger members 18, 25 move in the direction towards the output side (i.e., towards the left as seen with reference to FIG. 2).

The third input element 12c, which is connected to the end of the second input element 12b located at the output side (i.e., the left side shown in FIG. 2), is provided with an enlarged diameter portion 12cc. The enlarged portion 12cc is generally dome shaped and is accommodated in a small diameter recessed portion 16a of a reaction disc retainer 16. The reaction disk retainer 16 and the power piston 10 are connected to each other and move together as one body. A reaction disc 14 is arranged in a large diameter recessed portion 16b of the reaction disc retainer 16. The left end surface of the enlarged portion 12cc faces the reaction disc 14 while the opposite surface of the flange portion 12cc (i.e., the right surface of the flange portion 12cc) faces the bottom surface of the small diameter recessed portion 16a. As seen in FIGS. 1 and 2, a spring 28 under compression is arranged between the reaction disc retainer 16 and the front wall 2b of the housing 2.

An output rod 15 is arranged parallel to the center axis at the left side surface of the reaction disc 14, with the right end surface of the output rod 15 facing the reaction disc 14. A master cylinder or hydraulic system is operatively connected to the output end of the output rod 15. The master cylinder or the hydraulic system apply a reaction force on the input rod 11 via the reaction disc 14 and the input portion 12.

A solenoid coil 17 is disposed between the first plunger member 18 and the power piston 10. The solenoid coil 17 is designed to control the movement of the plunger members 18, 25.

The embodiment of the brake booster apparatus illustrated in FIG. 2 is designed to include five axially extending clearances identified as A, B, C, D and E. In FIG. 2, these clearances are shown under the non-operative condition of the brake booster apparatus.

Clearance "A" represents a clearance between the negative pressure control seal 23f and the negative pressure control seal valve 10a. Clearance "B" represents a clearance between an edge portion of the second biasing member 35 and the contact face 25d of the second plunger member 25. Clearance "C" represents a clearance between a flat portion of the second biasing member 35 and the contact face 25d of the second plunger member 25. Clearance "D" represents a clearance between the right surface of the flange portion 12cc and the bottom surface of the small recessed portion 16a formed in the reaction disc retainer 16. Clearance "E" represents a minimum clearance between the left surface of the flange portion 12cc and the reaction disc 14.

The clearance "C" represents a first predetermined value under the non-operating condition of the apparatus. When current is supplied to the solenoid coil 17, the first predetermined value changes to zero. In this state, the length between the output side end of the input portion 12 and the input side end of the second plunger member 25 is shortened.

The clearance "D" represents a second predetermined value under the non-operating condition of the apparatus. The clearance "D" permits movement of the third input element 12c in the direction towards the input side (i.e., to the right in FIG. 2).

The clearances are determined to satisfy the condition (D+A)≧C, and preferably D>C, with the value of D being set to be significantly larger than C. The clearances B is preferably determined so as to be larger than A (i.e.,A≦B).

The clearance value "C" is adjustable according to the relationship between the attractive force of the solenoid coil 17 and the load force of the second biasing member 35.

The clearances E is determined so as to be larger than A (i.e.,A≦E).

Figure 4:
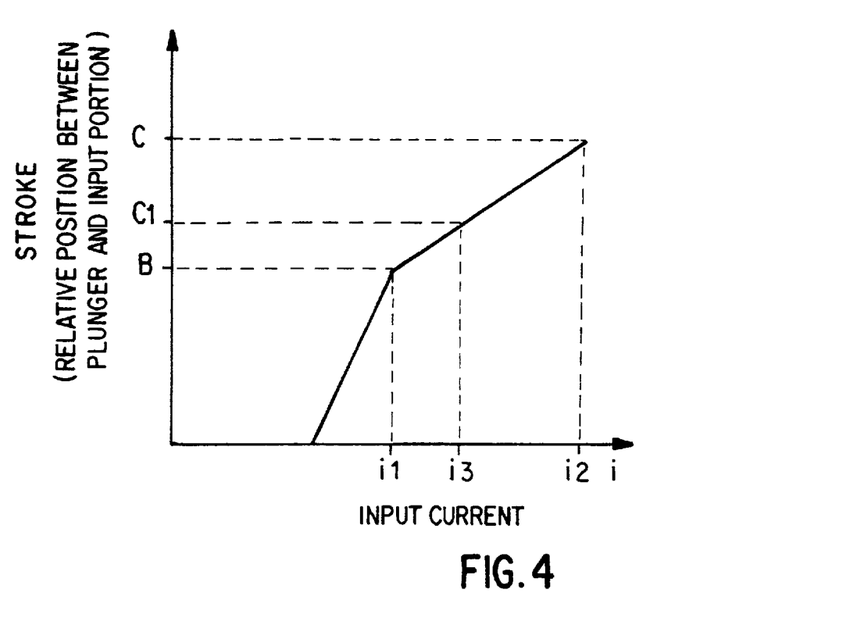
FIG. 4 is a graph illustrating the amount of current and the stroke of the plunger member.
Figure 5:
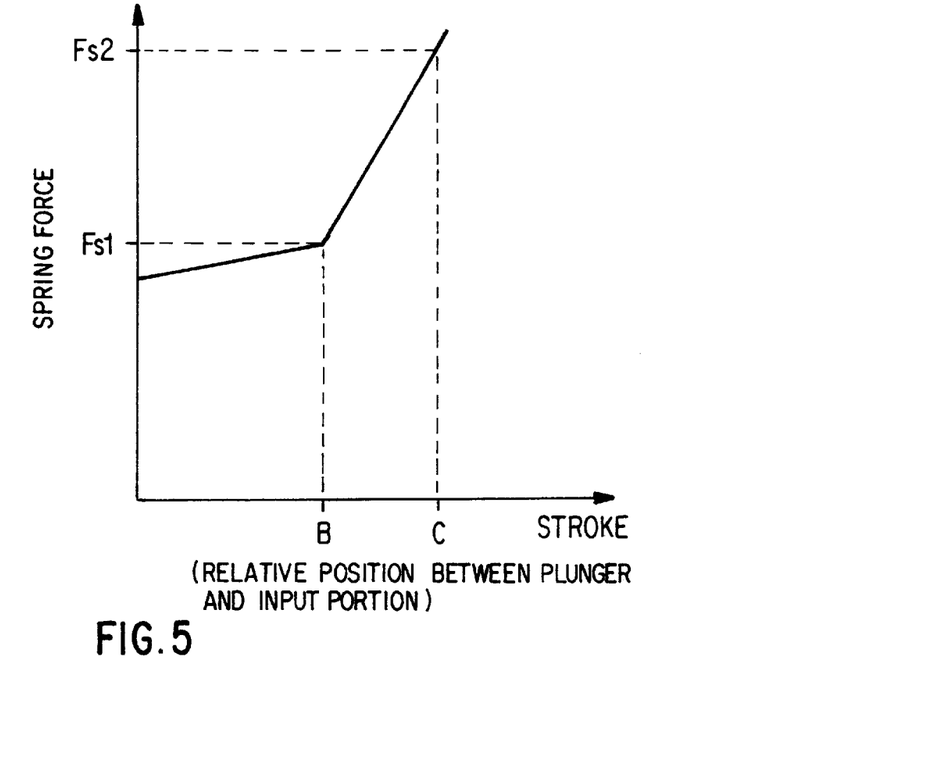
FIG. 5 is a graph illustrating the stroke of the plunger member and the biasing force of the biasing member.

FIG. 4 represents in graphical form the relationship between the value of the current supplied to the solenoid coil 17 and the relative position of the plunger member and the input portion 12. FIG. 5 represents in graphical form the relationship between the relative position of the plunger member and the input portion 12 and the load force applied by the first biasing member 27 and second biasing member 35. When current is supplied to the solenoid coil 17, the first plunger member 18 and the second plunger member 25 move against the first biasing member 27 and the second biasing member 35. As shown in FIGS. 4 and 5, the compression or spring force $F_s1$ of the first biasing member 27 is established within the clearance B. In this condition, the current value which is supplied to the solenoid coil 17 is $i_1$. On the other hand, the combined compression or spring force $F_s2$ of the first biasing member 27 and the second biasing member 35 are established between the clearances B and C. In this condition, the current value which is supplied to the solenoid coil 17 is $i_2$.

In accordance with the supplied current value, the relative positions of the plunger member and the input portion 12 are increased. The relative positions depend on the supplied current value of the solenoid coil 17 and the attractive force of the solenoid.

As shown FIG. 5, the biasing force corresponding to the clearance between zero and B is smaller than the biasing force corresponding to the clearance between B and C.

Having described the various features associated with the brake booster apparatus of the present invention, the operation of the brake booster apparatus will be described in detail under normal operating conditions and under automatic brake actuating conditions.

When the brake pedal is depressed by a driver with a depression force having a value $f_1$, the input rod 11 is moved forward (i.e., to the left as seen with reference to FIG. 2) in response to the applied force $f_1$, and in turn the input portion 12 (first, second and third input element 12a–12c) is moved forward with the input rod 11. In response to the movement of the input rod 11, the micro switch 33 is turned on and generates an operating signal. When the projecting portion 12e of the second input element 12b engages the step portion 18a of the first plunger member 18, the first and second plungers 18, 25 move forward together. The atmospheric control seal 23e and the negative pressure control seal 23f are also moved forward by the biasing force of the compression spring 21. The negative pressure control valve seal 23f then engages the negative pressure control seal valve 10a so that the variable pressure chambers 7, 9 are isolated from the constant pressure chambers 6, 8.

When the first and second plungers 18, 25 are further moved in the forward direction, the atmospheric control seal 23e becomes disengaged from the atmospheric control seal valve 25a to establish communication of the variable pressure chambers 7, 9 with the atmosphere so that atmospheric air flows into the variable pressure chambers 7, 9. A pressure differential is thus established between the constant pressure chambers 6, 8 and the variable pressure chambers 7, 9. This causes the movable walls 4, 5 to move forward as a result of the thrust force established by the pressure differential. The power piston 10 moves in the forward direction as a result of the forward movement of the movable walls 4, 5. Thus, an amplified braking force is applied to the output rod 15 from the power piston 10 through the reaction disc 14.

At this time, the reaction disc 14 is deformed by the reaction force applied from the output rod 15, and the braking output increases until the deformed portion of the reaction disc 14 is brought into engagement with the flange portion 12cc. That is, the reaction disc 14 does not engage the third input element 12c until the input force is increased to a value $f_1$, shown in FIG. 3. This causes the brake booster to generate a slight jumping output therefrom. When the reaction disc 14 is engaged with the third input element 12c at its deformed portion, the input elements 12a–12c are moved backward by a reaction force applied from the reaction disc 14, and in turn the first and second plunger members 18, 25 are moved backward by the biasing force of the first biasing member 27. At this time, the atmospheric control seal valve 25a is engaged with the atmospheric control seal 23e to interrupt the communication of the variable pressure chambers 7, 9 with the atmosphere, and to establish a balanced state of the brake booster.

Figure 6:
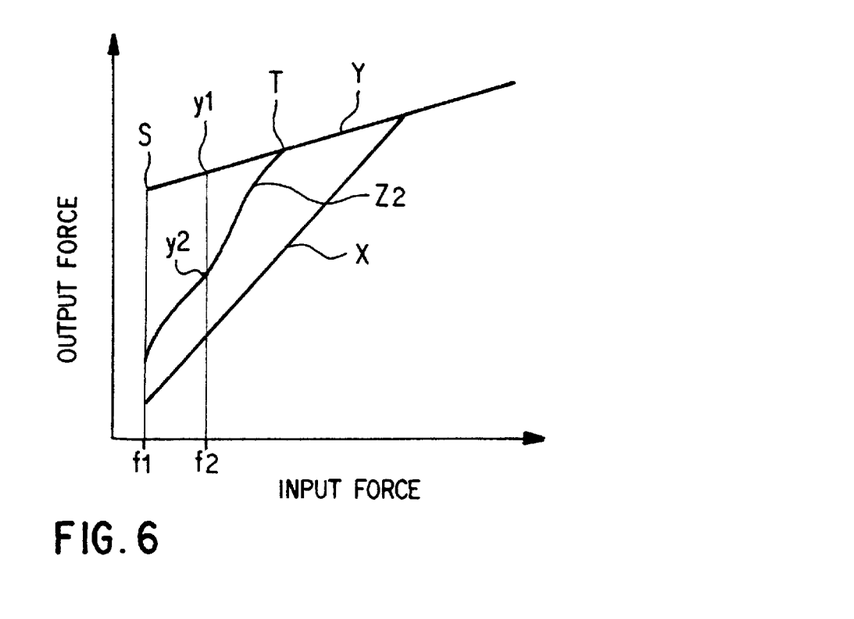
FIGS. 6, 7 and 8 are graphs illustrating further output characteristics of the brake booster of the present invention.

Thereafter, the vacuum control valve 10a, 23f and the air control valve 25a, 23e are alternatively opened and closed. The clearances A, B, C, D, E become the following: A→0;C→C;E→(E−A); and D→(D+A). The clearance "E−A" represents the deformed value of the reaction disc 14. The output force of the brake booster is increased at a ratio defined by the pressure receiving area of the reaction disc 14 relative to that of the flange portion 12cc of the third input member 12c. Once the maximum output power of the booster has been reached, the output force of the brake booster is increased in accordance with the increase of the input force. In this condition, the brake booster generates an output force along the line X shown in FIG. 6.

When the depression force applied to the brake pedal is released, the input elements 12a–12c are moved backward by the reaction force applied thereto during which the vacuum control valve 10a, 23f and the air control valve 25a, 23e are alternately opened and closed. After the reaction force is eliminated, the input rod 11 is retracted by the biasing force of the return spring 24. In turn, the second plunger member 25 is retracted by the biasing force of the first biasing member 27. The atmospheric control seal valve 25a is engaged with the atmospheric control seal 23e while the negative pressure control seal 23f is separated from the negative pressure control seal valve 10a by the clearance A.

When the brake pedal is rapidly depressed in an emergency situation, the solenoid coil 17 is energized by a current value $i_2$ to attract the first plunger member 18 and thereby effect an automatic brake actuating condition of the brake booster. When the input rod 11 is applied with an input force $f_2$, the second plunger member 25 is moved forward with the first plunger member 18 so that the clearance C becomes zero. As a result, the atmospheric control seal valve 25a is disengaged from the atmospheric control seal 23e to establish communication of the variable pressure chambers 7, 9 with the atmosphere so that atmospheric air flows into such chambers. This causes forward movement of the power piston 10. If the input rod 11 is continuously applied with the input force $f_2$, the input elements 12a–12c and input rod 11 are retracted by a reaction force applied from the reaction disc 14 in the clearance C. The negative pressure control seal valve 10a and the atmospheric control seal valve 25a are then brought into engagement with the negative pressure control seal 23f and the atmospheric control seal 23e respectively. During such operation of the brake booster, the various clearances are changed in the following manner: (E−A)→(E−A+C); and (D+A)→(D+A−C).

Figure 3:
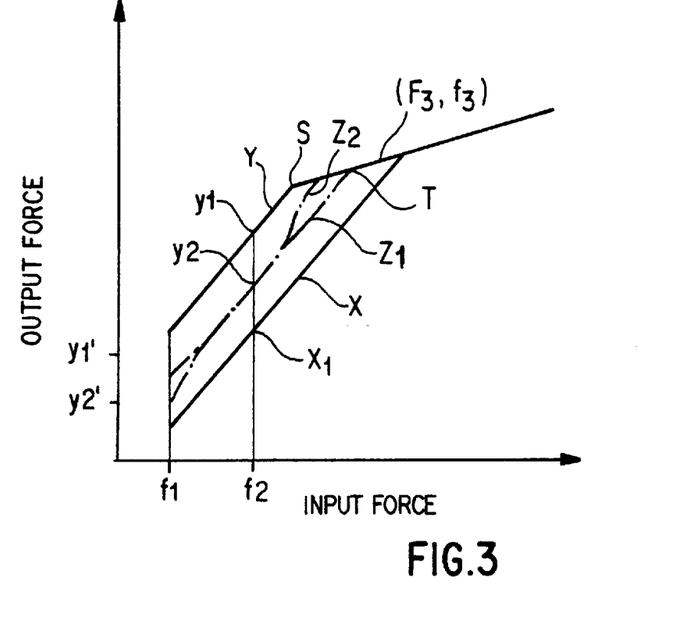
FIG. 3 is a graph illustrating the output characteristics of the brake booster of the present invention.

If the depression force $f_2$ of the brake pedal is applied under the energized condition of the solenoid coil, the output force of the brake booster is changed from a point $x_1$ to a point $y_1$ as shown in FIG. 3. That is, the output force $y_1$ responsive to the input force $f_2$ is generated. The difference between $x_1$ and $y_1$ represents an additional output value.

When the input force is further increased in such condition, the output of the brake booster is increased in accordance with the increase of the input force as represented by the line Y in FIG. 3. When the output power of the brake booster has reached its maximum value at a point S, the air control valve 25a, 23e is opened to maintain the communication of the variable pressure chambers 7, 9 with the atmospheric air. The air control valve 25a, 23e is maintained in the open position while the reaction disc 14 is compressed by the input force applied from the input rod 11 through the input elements 12a–12c. In this condition, the rate of increase of the input force on the input side is equal to or generally equal to the rate of increase of the output force on the output side.

When the brake pedal is released in a condition where the output force of the brake booster has been increased to a level defined by the point ($F_3,f_3$) shown in FIG. 3, the input rod 11 is moved backward by the biasing force of return spring 24. In turn, the plunger members 18, 25 are moved backward together with the input elements 12a–12c. As a result, the atmospheric control seal valve 25a engages the atmospheric control seal 23e to interrupt the communication of the variable pressure chambers 7, 9 with the atmosphere. At the same time, the negative pressure control seal 23f is separated from the negative pressure control seal valve 10a to effect communication of the variable pressure chambers 7, 9 with the constant pressure chambers 6, 8. This decreases the pressure differential between the constant pressure chambers 6, 8 and the variable pressure chambers 7, 9. Thus, the output of the brake booster decreases as represented by the line Y in FIG. 3, and the movable walls 4, 5 and power piston 10 are retracted to their initial positions.

When the depression force of the brake pedal is smaller than the biasing force of the compression spring 32, the first input rod 11a and the second input rod 11b are disengaged and the signal from the micro switch 33 is turned off. At the same time, the solenoid valve 17 is operated under the deenergized condition. As a result, the movable walls 4, 5 and the power piston 10 are retracted to their initial positions.

When the brake pedal has been rapidly depressed in an emergency situation, the solenoid coil 17 is energized by a current value $i_3$ to attract the first plunger member 18 and thereby effect the automatic brake actuating condition of the brake booster. When the input rod 11 is applied with an input force $f_2$, the second plunger member 25 is moved forward with the first plunger member 18 so that the clearance C becomes C–$C_1$. As a result, the atmospheric control seal valve 25a is disengaged from the atmospheric control seal 23e to establish communication of the variable pressure chambers 7, 9 with the atmosphere. This causes forward movement of the power piston 10. If the input rod 11 is continuously applied with the input force $f_2$, the input elements 12a–12c and the input rod 11 are retracted by a reaction force applied from the reaction disc 14 in the clearance $C_1$. The negative pressure control seal valve 10a and the atmospheric control seal valve 25a are then brought into engagement with the negative pressure control seal 23f and the atmospheric control seal 23e respectively. During such operation of the brake booster, the various clearances are changed in the following manner: (E–A)→(E–A+$C_1$); and (D+A)→(D+A–$C_1$).

If the depression force $f_2$ of the brake pedal is applied under the energized condition, the output force of the brake booster is changed from a point $x_1$ to a point $y_2$ as shown in FIG. 3. That is, the output force $y_2$ which is responsive to the input force $f_2$ is generated.

When the input force is further increased in such condition, the output of the brake booster is increased in accordance with the increase of the input force as shown by the line $Z_1$ in FIG. 3. When the output power of the brake booster has reached its maximum value at a point T, the air control valve 25a, 23e is opened to maintain the communication of the variable pressure chambers 7, 9 with the atmosphere. The air control valve 25a, 23e are maintained in the open position while the reaction disc 14 is compressed by the input applied from the input rod 11 through the input element 12a–12c. In this condition, the rate of increase of the input force on the input side is equal to or generally equal to the rate of increase of the output force on the output side.

When the brake pedal is released in a condition where the output force of the brake booster has been increased to a level defined by the point ($F_3$, $f_3$) shown in FIG. 3, the input rod 11 is moved backward by the biasing force of the return spring 24. The plunger members 18, 25 are thus moved backward together with the input elements 12a–12c. As a result, the atmospheric control seal valve 25a engages the atmospheric control seal 23e to interrupt the communication of the variable pressure chambers 7, 9 with the atmosphere, while the negative pressure control seal 23f is separated from the negative pressure control seal valve 10a to effect communication of the variable pressure chambers 7, 9 with the constant pressure chambers 6, 8. This decreases the pressure differential between the constant pressure chambers 6, 8 and the variable pressure chambers 7, 9. Thus, the output of the brake booster decreases as represented by the line $Z_1$. in FIG. 3, and the movable walls 4, 5 and the power piston 10 are retracted to their initial positions.

Under the condition in which current having a value $i_3$ and a brake depression force having a value $f_2$ are applied, if the applied current value $i_3$ changes to $i_2$, the second plunger member 25 is moved forward with the first plunger member 18 so that the clearance (C–$C_1$) becomes almost zero. As a result, the atmospheric control seal valve 25a is disengaged from the atmospheric control seal 23e to establish communication of the variable pressure chambers 7, 9 with the atmosphere. This causes forward movement of the power piston 10. If the input rod 11 is continuously applied with the input force $f_2$, the input elements 12a–12c and the input rod 11 are retracted by the reaction force applied from the reaction disc 14. In turn, the negative pressure control seal valve 10a and the atmospheric control seal valve 25a are brought into engagement with the negative pressure control seal 23f and the atmospheric control seal 23e respectively. During such operation of the brake booster, the various clearances change in the following manner: (E–A+$C_1$)→(E–A+C); and (D+A–$C_2$)→(D+A–C).

If the depression force $f_2$ of the brake pedal is applied under the energized condition, the output force of the brake booster is changed from a point $Y_2$ to a point $y_1$ as shown in FIG. 3. That is, because the output value $y_2$ is generated, the output value $y_1$ is established. The difference between the output values $Y_2$ and $y_1$ represents an additional output value.

When the input force is further increased in such a condition, the output of the brake booster is increased in accordance with the increase of the input force as represented by the line Y in FIG. 3.

As can be seen from the above description, if the supplied current value continuously changes, the output value changes continuously in response to the current value. Namely, by virtue of the present invention, an elective operational characteristic $Z_2$ can be established.

The brake booster of the present invention is capable of a solenoid only operating condition in which depression of the brake pedal is not required. During the condition when current $i_3$ is applied, the second plunger member 25 is moved forward with the first plunger member 18 so that the clearance C becomes (C–$C_1$). As a result, the length between the end portion of the second plunger member 25 and the tip portion of the input portion 12 is reduced by $C_1$. The atmospheric control seal valve 25a is disengaged from the atmospheric control seal 23e to establish communication of the variable pressure chambers 7, 9 with the atmosphere so that atmospheric air flows into the variable pressure chambers 7, 9. This causes forward movement of the power piston 10. In this condition, as shown in FIG. 3, the output value $Y_2$' is generated. The output value of the brake booster is continuously determined in response to the applied current value for the solenoid coil 17. As shown in FIG. 3, the maximum output value of the brake booster is $y_1$'.

In the above-described embodiment, the relationship amongst the clearances A, C and D is (D+A)≧C or D>C. However, the relationship (D+A)≦C is also applicable to this embodiment. In this condition, the operating characteristic of the brake booster is graphically represented in FIG. 6.

Between the first input element 12a and the second plunger member 25, there is defined the clearance "C" to permit movement of the plunger member 25 when the solenoid coil 17 is energized. Further, between the enlarged portion 12cc of the third input element 12c and the bottom of the small recessed portion 16a, there is defined the clearance "D" to permit movement of the input portion 12. The reaction disc 14 is deformed by the reaction force applied from the output rod 15, and the balanced state is established when the deformed portion of the reaction disc 14 fills up the clearance "D" so that the clearance "D" becomes zero. In response to the movement of the input portion 12, relative movement of the plunger members 18, 25 occurs when the solenoid is in the energized condition. As a result, each of the clearances control the operation of the air and vacuum control valves, and establish a balanced state of the brake booster.

In accordance with the present invention, notwithstanding the energized condition, the output value of the brake booster is controlled in proportion to the depression value of the brake pedal.

In addition, between the plunger member and the input portion are disposed the first biasing element 27 and the second biasing element 35. As a result, the relative position between the plunger members and the input portion is determined in response to the supplied current value. The clearance "C" is determined in accordance with the relative position between the plunger and the input portion. As a result, the additional output by the solenoid is determined in response to the clearance value "C".

In the condition where the attractive force is enough to control the plunger, the input-output characteristics of the brake booster are represented by the line Y in FIG. 3. If the supplied current value continuously changes, an optional input-output characteristic is established between the line X and the line Y, for example $Z_1$ or $Z_2$.

Figure 7:
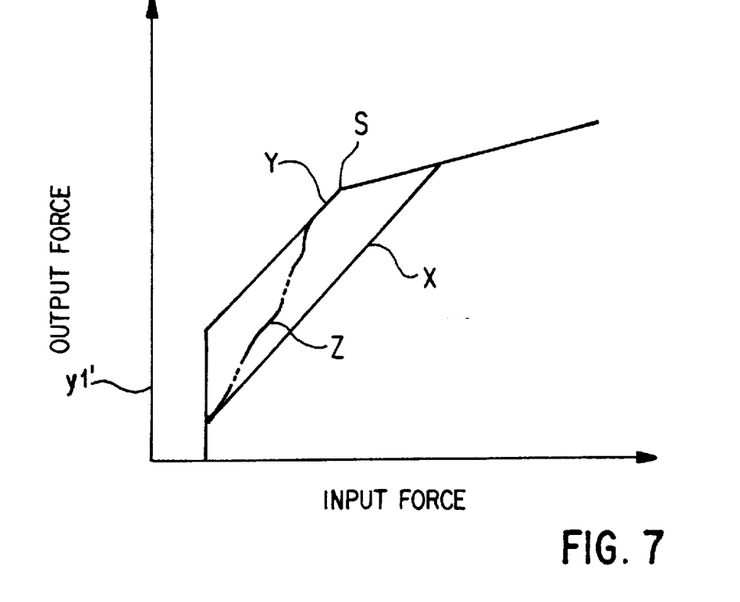
Figure 8:
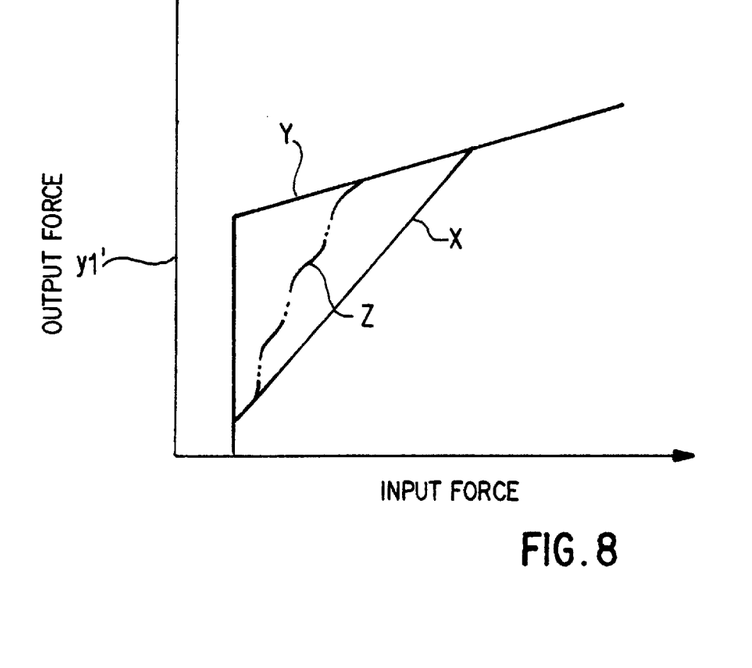

As shown in FIG. 7, the characteristic line Z which is controlled in response to the current value can combine a full servo characteristic line Y. The full servo operating condition Y is determined in accordance with the mechanical specification. The characteristic line Z is controlled in response to the supplied current value. In this condition, the output value of the brake booster is limited by the characteristic line Y. In response to the supplied current value, the brake booster generates an output force without depression of the brake pedal. In this condition, the maximum output value is fixed at a value $y_1'$ which is determined in accordance with the characteristic line Y. As a result, a high reliable brake booster can be produced.

The value of the clearance "C" is effective to make use of the output of the brake booster. The line X represents a normal brake operating condition, the line Y represents a solenoid actuated operating condition, the line Z represents a solenoid actuated operating condition (a continuously changing current value condition) and a solenoid actuated output $y_1'$ without depression of the brake pedal.

The principles, a preferred embodiment and modes of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake booster apparatus for a vehicle comprising:

a housing forming a pressure chamber;

a movable wall arranged in said pressure chamber and dividing the pressure chamber into a constant pressure chamber and a variable pressure chamber;

a power piston on which is mounted said movable wall;

an input rod extending outwardly from said power piston for connection to a brake pedal to be moved by depression of the brake pedal;

an axially movable input member mounted within said power piston and operatively engaged with said input rod;

an axially movable plunger member carried by said input member;

an air control valve positioned in the power piston for selectively permitting and preventing communication of said variable pressure chamber with atmosphere;

a vacuum control valve positioned within the power piston for selectively permitting and preventing communication between said variable pressure chamber and said constant pressure chamber;

a reaction disc for generating a reaction force in accordance with propulsive power of said power piston based on a pressure difference between said variable pressure chamber and said constant pressure chamber;

an output rod for transmitting an output force of said power piston through said reaction disc;

a solenoid coil for actuating said plunger member in response to a supplied current value under an energized condition of the solenoid coil;

said plunger member being movable in response to movement of said input member under the energized condition of the solenoid coil with the output force continuously changing in response to the supplied current value of said solenoid coil.

2. A brake booster apparatus for a vehicle as set forth in claim 1, wherein an axial clearance is formed between said input member and said plunger member.

3. A brake booster apparatus for a vehicle as set forth in claim 1, wherein an amount of relative movement between said plunger member and said input member is adjusted in response to an attractive force of said solenoid coil.

4. A brake booster apparatus for a vehicle as set forth in claim 1, wherein a first biasing member and a second biasing member are arranged between said input member and said plunger member.

5. A brake booster apparatus for a vehicle as set forth in claim 4, wherein said first biasing member and said second biasing member are arranged in series.

6. A brake booster apparatus for a vehicle comprising:

a housing forming a pressure chamber;

a movable wall arranged within said pressure chamber and forming a constant pressure chamber and a variable pressure chamber;

a power piston carried by said movable wall;

an input rod extending outwardly from said power piston for connection to a brake pedal to be moved by depression of the brake pedal;

an axially movable input member mounted within said power piston and operatively engaged with said input rod;

an axially movable plunger member disposed within said power piston;

a first biasing member arranged between said input member and said plunger member;

a second biasing member arranged between said input member and said plunger member;

an air control valve positioned within the power piston for selectively permitting and preventing communication between said variable pressure chamber and atmosphere;

a vacuum control valve positioned within the power piston for selectively permitting and preventing communication between said variable pressure chamber and said constant pressure chamber;

an output rod transmitting an output force of said power piston; and a solenoid for actuating said plunger member during an energized condition of the solenoid.

7. A brake booster apparatus for a vehicle as set forth in claim 6, wherein said second biasing member is a dish shaped biasing member and the first spring is a coil shaped biasing member.

8. A brake booster apparatus for a vehicle as set forth in claim 6, wherein said first biasing member and said second biasing member are arranged in series.

9. A brake booster apparatus for a vehicle as set forth in claim 6, wherein said input member and said plunger member are arranged so that an axial clearance is provided between said input member and said plunger member.

10. A brake booster apparatus for a vehicle as set forth in claim 6, wherein said vacuum control valve includes a negative pressure control seal valve provided on the power piston and a negative pressure control seal that engages the negative pressure control seal valve.

11. A brake booster apparatus for a vehicle as set forth in claim 6, wherein said air control valve includes an atmospheric control seal valve provided on the plunger member and an atmospheric control seal that engages the atmospheric control seal valve.

12. A brake booster apparatus for a vehicle comprising:

a housing forming a pressure chamber;

a movable wall arranged within said pressure chamber and forming a constant pressure chamber and a variable pressure chamber;

a power piston carried by said movable wall;

an input rod extending outwardly from said power piston for connection to a brake pedal to be moved by depression of the brake pedal;

an axially movable input member mounted within said power piston and operatively engaged with said input rod;

an axially movable plunger member disposed within said power piston;

an air control valve positioned within the power piston for selectively permitting and preventing communication between said variable pressure chamber and atmosphere;

a vacuum control valve positioned within the power piston for selectively permitting and preventing communication between said variable pressure chamber and said constant pressure chamber;

an output rod transmitting an output force of said power piston;

a solenoid for actuating said plunger member during an energized condition of the solenoid; and means for changing the output force during the energized condition of the solenoid whenever said input rod is moved in response to depression of the brake pedal.

13. A brake booster apparatus for a vehicle as set forth in claim 12, including a reaction disc retainer connected to the power piston and a reaction disk positioned in a first recessed portion of the reaction disk retainer, the input portion having an enlarged end portion at an end of the input portion located closest to the reaction disc, the reaction disk retainer including a second recessed portion in which is positioned the enlarged end portion at the end of the input portion.

14. A brake booster apparatus for a vehicle as set forth in claim 13, wherein the enlarged end portion of the input portion is positioned in the second recessed portion so that a clearance exists between a bottom of the second recessed portion and a surface of the enlarged end portion of the input portion that faces the bottom of the second recessed portion.

15. A brake booster apparatus for a vehicle as set forth in claim 12, including a first biasing member and a second biasing member arranged between said input member and said plunger member.

16. A brake booster apparatus for a vehicle as set forth in claim 15, wherein said first biasing member and said second biasing member are arranged in series.

17. A brake booster apparatus for a vehicle as set forth in claim 12, wherein said input member and said plunger member are arranged so that an axial clearance is provided between said input member and said plunger member.

18. A brake booster apparatus for a vehicle as set forth in claim 12, wherein said vacuum control valve includes a negative pressure control seal valve provided on the power piston and a negative pressure control seal that engages the negative pressure control seal valve.

19. A brake booster apparatus for a vehicle as set forth in claim 12, wherein said air control valve includes an atmospheric control seal valve provided on the plunger member and an atmospheric control seal that engages the atmospheric control seal valve.

* * * * *